(12) United States Patent  (10) Patent No.: US 7,447,889 B2
Cartes et al.  (45) Date of Patent: Nov. 4, 2008

(54) METHOD AND APPARATUS FOR CONFIGURING A COMPUTER SYSTEM UTILIZING A READ ONLY MEMORY STORING AN OPTION FILE CONTAINING SELECTABLE CONFIGURATION OPTIONS AND A SCRIPT FILE

(75) Inventors: Andrew C. Cartes, Cypress, TX (US); Andrew Brown, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 447 days.

(21) Appl. No.: 11/110,157

(22) Filed: Apr. 20, 2005

(65) Prior Publication Data

US 2006/0242396 A1   Oct. 26, 2006

(51) Int. Cl.
*G06F 9/00* (2006.01)
*G06F 15/177* (2006.01)

(52) U.S. Cl. .................. 713/1; 713/2; 713/100
(58) Field of Classification Search .......... 713/1, 713/2, 100; 707/9, 10; 709/200
See application file for complete search history.

(56) References Cited

U.S. PATENT DOCUMENTS

| 5,694,581 | A  | * | 12/1997 | Cheng ........................... 710/7 |
| 6,098,067 | A  | * | 8/2000 | Erickson ...................... 707/10 |
| 6,993,643 | B2 | * | 1/2006 | Powell .......................... 713/1 |
| 2003/0233571 | A1 | * | 12/2003 | Kraus et al. .................. 713/200 |
| 2004/0250137 | A1 | * | 12/2004 | Takahashi .................... 713/201 |
| 2005/0251546 | A1 | * | 11/2005 | Pichetti et al. .............. 709/200 |

OTHER PUBLICATIONS

"System Management BIOS (SMBIOS) Reference Specification," Version 2.4, Jul. 21, 2004, Distributed Management Task Force, Inc., Specification DSP0134, 97 pp.
"Integrated Lights-Out Virtual Serial Port Configuration And Operation," TC041106HT, Nov. 2004, 18, pp., Copyright 2004 Hewlett-Packard Development Company, L.P.
"Best Practices for Integrated Lights-Out," TC030606BP, Jun. 2003, 22 pp. Copyright 2003 Hewlett-Packard Development Company, L.P.

* cited by examiner

*Primary Examiner*—Suresh K Suryawanshi

(57) ABSTRACT

An apparatus for configuring a computer system is disclosed. The apparatus comprises a processor, a read only memory (ROM) coupled to the processor, and a management device coupled to the read only memory. During operation, the management device preferably receives at least some data from the ROM.

18 Claims, 3 Drawing Sheets

METHOD AND APPARATUS FOR CONFIGURING A COMPUTER SYSTEM UTILIZING A READ ONLY MEMORY STORING AN OPTION FILE CONTAINING SELECTABLE CONFIGURATION OPTIONS AND A SCRIPT FILE

BACKGROUND

Computers may be used to perform various tasks. In general, a computer may include a processor to execute instructions and storage for storing the instructions to be executed. Thus, many devices, such as printers, personal computers, laptops, and fax machines, may be referred to as "computers."

In some situations, it is desirable to network multiple computers together to perform functions such as data storage, data processing, or printing. For example, a computer that is being used as a workstation by a user may be networked to a computer acting as an internet server. Regardless of the type of computer implemented, each computer in the network may implement environment variables (EVs). Briefly put, an EV is a global setting, or configuration parameter, which is available to various applications and levels of hardware. One example of an EV includes the boot order, or initialization sequence, of a computer. For instance, the boot order EV may be configured so that the computer checks for the presence of a floppy disk in the floppy disk drive before booting from the master boot sector of the hard drive.

Configuring the EVs typically includes a user modifying the EVs using a configuration tool. For example, the user may modify the boot order of the machine such that the hard drive is the first drive consulted in the initialization sequence by making the appropriate entries in the configuration tool. This configuration tool is usually a set of programs stored in a read-only memory (ROM). The actual EV settings, such as boot order, are stored in a non-volatile storage medium including a non-volatile random access memory (NVRAM). Changes stored in the NVRAM usually are effectuated on the next boot up of the computer. Other changes, such as turning on a power savings mode, may be effectuated currently.

In systems having numerous computers coupled together in a network fashion, there may be numerous ROMs where each ROM is unique. Further, each unique ROM may require a different configuration setting to effectuate the same desired result. For example, setting the boot order (e.g., floppy then hard drive) on one computer may involve different ROM configuration settings than setting the same boot order on another computer in the network. Thus, each unique ROM may require individual configuration making network wide changes a time consuming proposition.

BRIEF SUMMARY

An apparatus for configuring a computer system is disclosed. The apparatus comprises a processor, a read only memory (ROM) coupled to the processor, and a management device coupled to the read only memory. During operation, the management device preferably receives at least some data from the ROM.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
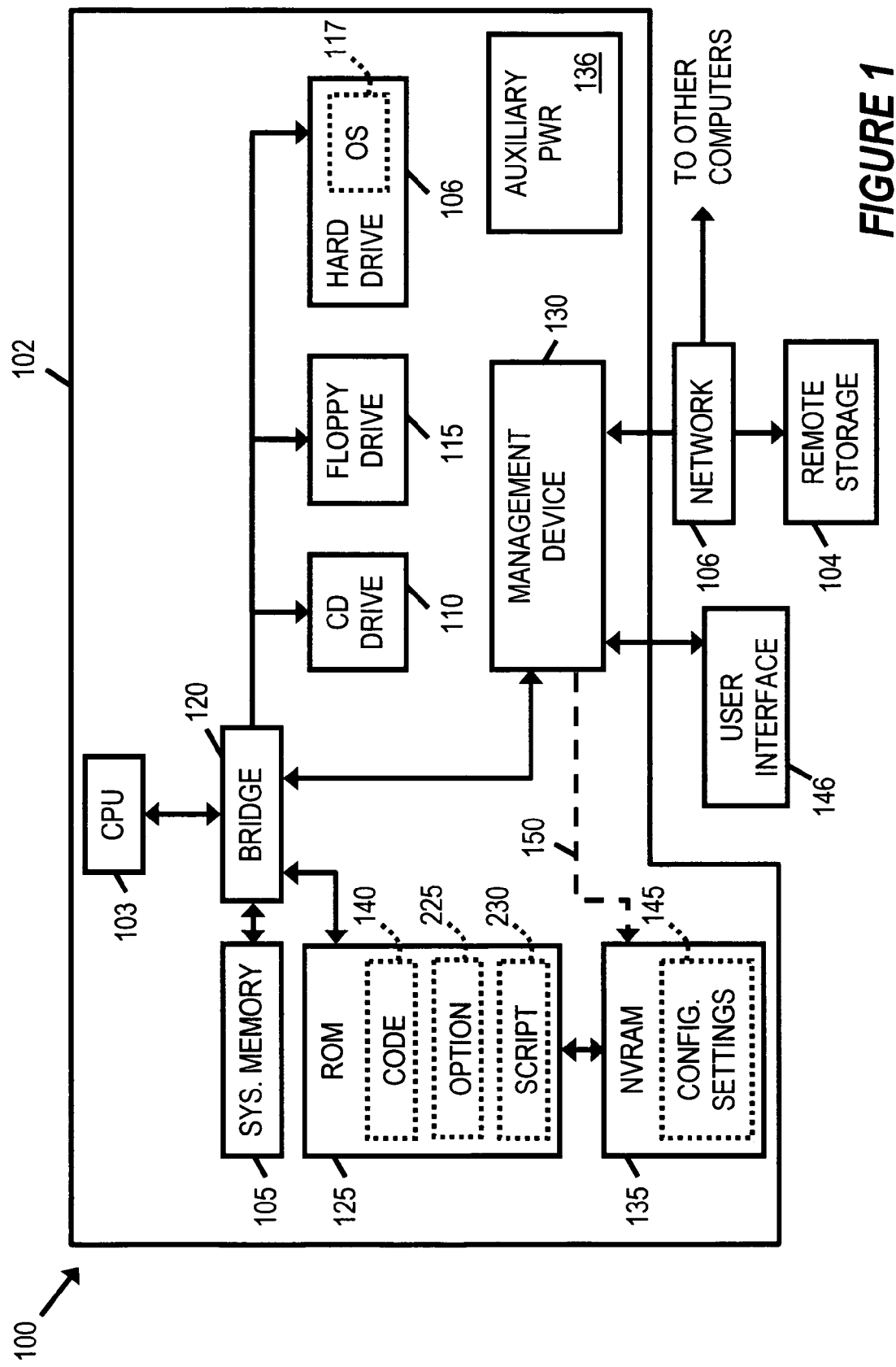
FIG. 1 illustrates a block diagram of an exemplary system.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

The term "host computer" is intended to refer to a network computer that has other computers connected to it, such as a server. Each computer connected to the host computer may be referred to as a "client."

The term "management device" is intended to refer to any device that permits remote control functionality such as remote system configuration, remote power control, remote system reset, or remote operating system (OS) console of a host computer system.

The term "blade server" is intended to refer to a computer system with one of its dimensions, usually the width, smaller than the rest. This is usually accomplished by integrating a majority of the server's components (including processor(s), memory, network cards, etc.) onto the motherboard, allowing multiple blade servers to be rack mounted within a common cabinet.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the invention are directed to systems and methods that utilize a plurality of management devices to perform system configuration of a plurality of host computers. At least one management device preferably accompanies each host computer. These management devices may enable peripheral connections to access configuration data of the accompanying host computer. In some embodiments, the management device may modify data stored in non-volatile storage space without regard to the operational state of the accompanying host computer and without regard to the unique system configuration requirements of the accompanying host computer.

In other embodiments, there may be numerous host computers managed by a single remote management device. Since each host computer may include different hardware, each host computer may require different settings to achieve the same configuration. The management device may include multiple configuration files particular to each host computer. These configuration files may come from ROM devices located within each host computers that is being managed. Preferably, a ROM device is associated with a particular element within the host computer (such as a hard disk controller) so that the configuration files may include configuration information particular that element. In the event that a particular element across the numerous host computers is to be configured (such as the hard disk controller), the management device may select and use a configuration file that includes the appropriate configuration settings for each host computer. Since ROM devices located in each host computer provide detailed configuration setting requirements, the management device may implement system wide changes in the abstract. Such an approach may prove advantageous in systems containing hundreds of host computers, each different configuration settings.

FIG. 1 illustrates a block diagram of a system 100 in accordance an embodiment of the invention. As depicted in FIG. 1, the system 100 may comprise a host computer system 102 that couples to a remote storage 104 via a network 106. Some embodiments of the present invention may implement system 100 as a host of rack mounted server equipment along with a bank of storage devices that exist in a separate physical location. In these embodiments host computer 102 may be implemented as a plurality of blade-type servers.

Briefly put, a "blade server" is a compact server with at least one of its principal dimensions, usually the width, smaller than the other dimensions such that multiple blade servers may be placed side-by-side on a rack or other suitable enclosure. Notably, blade servers usually are configured to minimize external cables and maximize serviceability, which may make them difficult to access and configure using traditional methods. Thus, configuring blade servers using the methods disclosed herein may provide advantages. Suitable commercial systems for host computer 102 may include blade server BL20P manufactured by Hewlett Packard.

In order to provide desired functionality of system 100, host computer 102 may be configured in various ways. For example, host computer 102 may be configured to handle the computing workload of other computers, execute a particular piece of software, or allow communication among the client computers over network 106. As host computer 102 operates, it may store data in and retrieve data from remote storage 104.

Host computer system 102 also may comprise a Central Processing Unit (CPU) 103 coupled to local storage such as a system memory 105, a hard drive 106, a compact disk (CD) drive 110, and a floppy drive 115, all via a bridge 120. Although bridge 120 is depicted in FIG. 1 as a single structure, it should be understood that in practice, it may comprise multiple separate bridge structures. For example, memory 105 may couple to CPU 103 via a first bridge device that is physically closer to CPU 103 than a second bridge device, which couples hard drive 106 to CPU 103. During operation, CPU 103 may fetch data from and store data to any of the storage locations, both remote and local. Further, an operating system (OS) 117 may be stored locally on hard disk 106.

Since host computer 102 may be configured in a variety of configurations, including as a host server to client computers, hard disk 106 may be implemented as an array of disks in some embodiments of the present invention. In these embodiments, the array of disks may be organized as a Redundant Array of Independent Disks (RAID), and may provide data redundancy as well as faster data recoverability in the event of a disk crash. These benefits may be achieved by spreading or duplicating data across multiple disk drives according to various RAID techniques, including: RAID 0 (Data Striping); RAID 1 (Disk Mirroring); and RAID 5 (Striping with Distributed Parity). Despite hard disk 106 being implemented as a RAID, hard disk 106 still may appear to host computer 102 as a single device.

In addition to being coupled to storage devices, CPU 103 also may couple to a read-only memory (ROM) 125 and a management device 130 via bridge device 120. The specific connection between management device 130 and bridge device 120, or between other devices in system 100, may vary based on the various embodiments of the present invention. For example, in some embodiments, management device 130 may be coupled, along with other devices in system 100, to a Peripheral Component Interconnect (PCI) bus. Meanwhile, in other embodiments, management device 130 may be coupled to system 100 via an $I^2C$ bus or through a virtual serial port connection. Alternatively, management device 130 may exist at a remote location and couple to system 100. Regardless of the type of connection to system 100, management device 130 preferably communicates with various devices in the system 100 to modify configuration data, such as the configuration data of ROM 125. Suitable commercial embodiments for management device 130 include an integrated lights out (iLO) processor manufactured by Hewlett-Packard.

ROM 125 may further couple to a non-volatile storage device, such as non-volatile random access memory (NVRAM) 135. The non-volatile nature of NVRAM 135 indicates that its contents are preserved when host computer 102 is powered off. Additionally, in some embodiments of the present invention, an auxiliary power source 136 may provide NVRAM 135 a back up power source, enabling NVRAM 135 to retain its contents while host computer 102 is powered off. Power source 136 also may provide power to management device 130 while host computer 102 is powered off.

When host computer 102 initializes itself, for example on startup or reboot, it will require initial code to execute. Accordingly, code 140 is stored in ROM 125, and during system initialization, code 140 is copied into memory 105 for use by computer 102. Code 140 is sometimes referred to as the Basic Input-Output System (BIOS) code, and generally includes instructions on how to load basic computer hardware as well as routines for handing off control of host computer 102 to OS 117 when appropriate.

One of the routines that may be stored in code 140 is an initialization test, referred to as a Power On Self Test (POST), which checks the operational status of the electrical circuitry of host computer 102. In addition to POST, code 140 may include configuration routines that modify and store a plurality of configuration settings 145 within NVRAM 135 by accessing and changing environment variable (EV) values. Configuration settings 145 may include numerous options, such as: the boot order of host computer 102 (e.g., floppy drive 110 then hard drive 115 or vice versa), the RAID configuration for various hard disks 115 (e.g., RAID 0 or RAID 1), the clock speed setting of CPU 103, and the configuration of memory 104 to name but a few. Configuration settings 145 may be conveyed to a user by ROM 125 through a user interface 146 coupled to host computer 102. User interface 146 may be a ROM based setup utility, a command line interface, or a web page. Additionally, other devices (not shown in FIG. 1) within host computer 102 may include separate ROMs that have separate non-volatile storage spaces for their separate configuration settings—e.g., video card configuration settings that may be modified by a video ROM.

Management device 130 preferably is coupled to NVRAM 135, either directly via a connection 150, or through the connection to bridge 120. If other devices within host computer 102 include separate configuration settings and separate ROMs, such as a RAID controller for hard drive 106, then those configuration settings also may be adjusted using management device 130.

In some embodiments, the configuration settings 145 may be abstracted and stored in ROM 125 as a plurality of data structures, such as option file 225 and script file 230. Preferably, ROM 125 generates script file 230 and option file 225 based on the potential configuration of the element that ROM 125 is associated with. For example, if ROM 125 is associated with an array of hard disks then ROM 125 may generate option file 225 that includes the various RAID configuration options. Similarly, ROM 125 may generate a script file 230 including various subroutines used to implement the various RAID configurations. During operation, option and script files 225 and 230 may be copied by management device 130 and used when configuring the host computer 102 or when configuring other computers on the network 106.

When multiple host computers 102 are implemented in system 100, as is often the case in a business enterprise, the total possible configuration settings 145 may become difficult to configure and keep track of all of the possible configurations. In the various embodiments of the present invention, remote management device 130 may alleviate some of these difficulties by providing remote modification and adjustment of various configuration settings without having to keep track of the specific configuration of each host computer 102. That is, by using the configuration specific information (e.g., option file 225) and their associated scripts (e.g., script file 230), that is generated and provided by the ROM of the particular host computer being configured, management device 130 may be able to configure multiple host computers in the abstract.

In order to adjust configuration settings 145, management device 130 preferably receives abstracted information regarding the potential configuration options of each host computer 102 in system 100 (e.g., potential RAID configurations=0, 1, and 5), where the potential configuration of each host computer 102 may vary. In addition to the potential configurations varying, the way that the potential options are presented to the user, i.e., user interface 146, also may vary. For example, some host computers 102 may include a ROM based setup utility for user interface 146, others may include a command line setup utility, while still others may include a web based setup utility. Accordingly, with each host computer 102 potentially having a separate user interface and separate configurations options, the management device 130 located in each host computer 102 may receive particular configuration information from various components within host computer 102 so that it may configure the host computers in the abstract. For instance, a user may program management device 130 (e.g., using user interface 146), to effectuate a RAID=1 configuration across all host computers without having specific knowledge of the particular configuration information required to achieve this RAID=1 configuration on each individual host computer.

To provide this particular configuration information, ROM 125 may present data structures (such as option file 225 and script file 230), that include a description of user interface 146 and the various methods of configuration, to management device 130. Preferably, each management device 130 is uniform among the various host computers 102 in system 100. Thus, a single user interface may be operated by a system administrator (see e.g., user interface 146 in FIG. 2B). For example, on a client computer connected to network 106, a single user interface may broadcast changes to configuration settings 145 of each host computer 102 without regard to the specific configuration options or the specific user interfaces of each host computer 102.

Figure 2A:
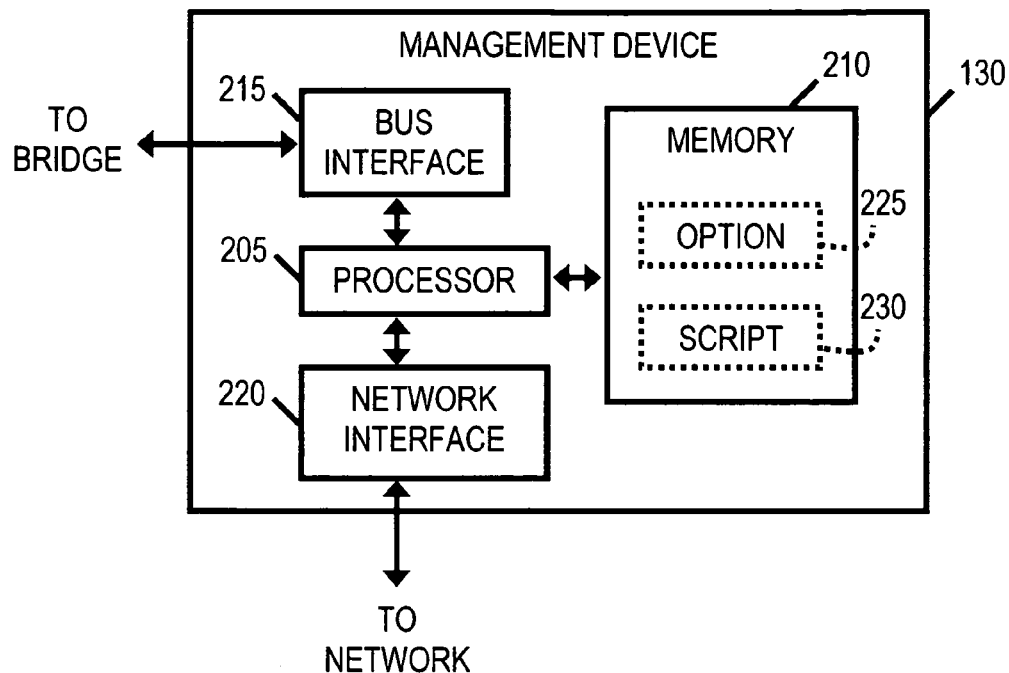
FIG. 2A represents a block diagram of an exemplary management device.

FIG. 2A illustrates a block diagram of a management device 130, for use with system 100 of FIG. 1, in accordance with exemplary embodiments of the invention. As illustrated in FIG. 2A, management device 130 may include a processor 205 coupled to a memory 210. Processor 205 also may couple to a bus interface 215 and a network interface 220. Management device 130 preferably receives data (such as option and script files 225 and 230) from ROM 125 via bus interface 215 and stores this data in memory 210. Note that in some embodiments, management device 130 may receive data from other locations in system 100, such as from a ROM based RAID controller of hard drive 106.

For example, option file 225 may indicate the configuration options and choices for a RAID controller such as Data Striping, Disk Mirroring, or Striping with Distributed Parity. Additionally, option file 225 may indicate how selected configurations are stored for later use and how configuration conflicts are resolved. Once a desired RAID configuration is indicated, such as Data Striping, management device 130 may match the appropriate sub-routines in script file 230 to accomplish Data Striping and processor 205 may execute these sub-routines such as by allocating input-output resources and system memory 105 in system 100. For example, to select a desired RAID level, system environment variable CQSACS at offset 24 may be modified to contain an enumerated value indicating the operating RAID mode (e.g., 0=RAID 0, 2=RAID 1, 3=RAID 5, 5=none).

Depending on the complexity of the configuration change made, any particular script may be a compound script that includes multiple sub-routines.

Figure 2B:
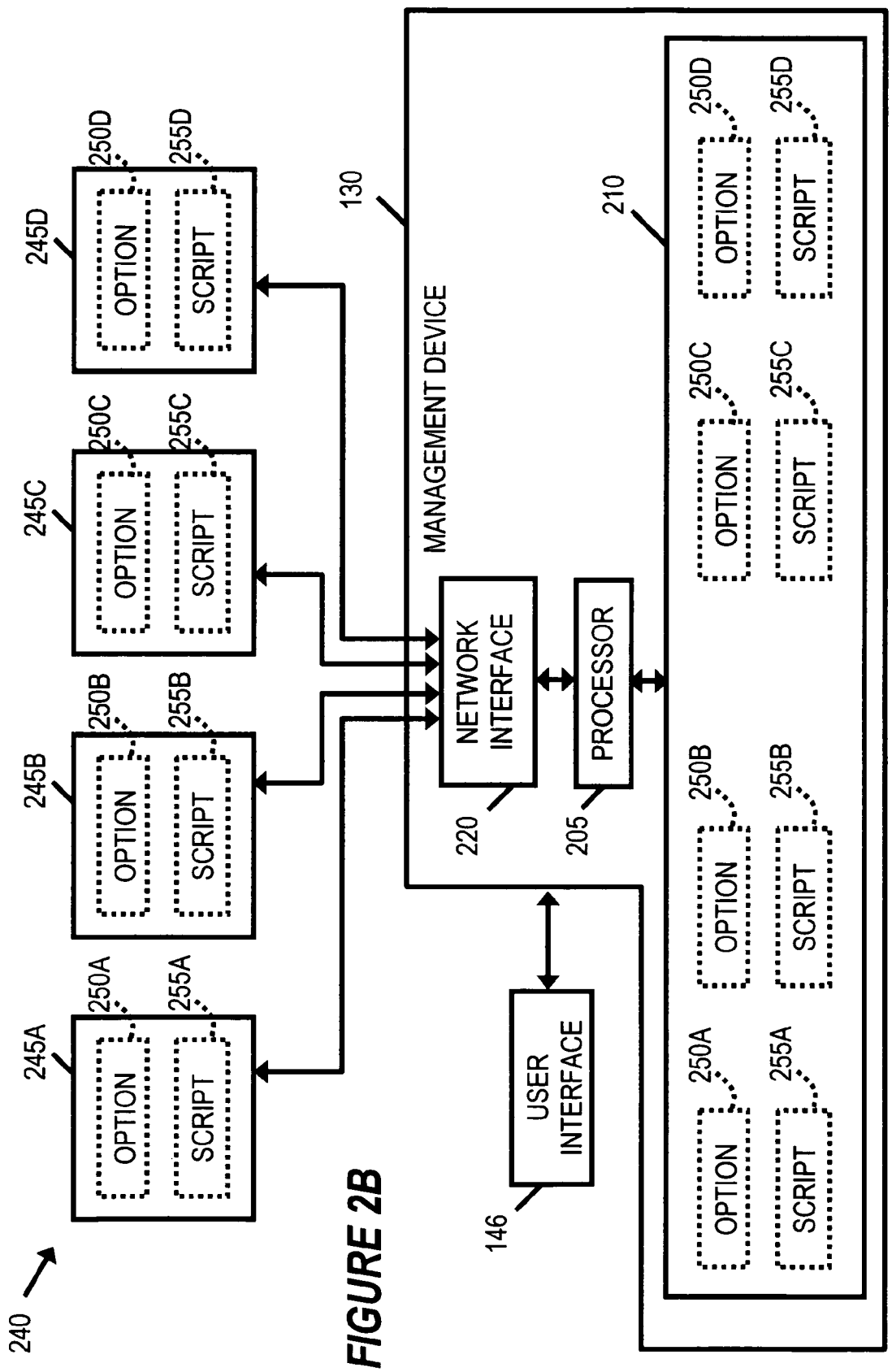
FIG. 2B represents a block diagram of an exemplary management device coupled to a plurality of host computers.

FIG. 2B represents an exemplary system 240 including multiple host computers 245A-D each including their own option files 250A-D and script files 255A-D. Host computers 245A-D couple to management device 130. As each host computer 245A-D is initially introduced in system 240, it may provide option file 250A-D and script file 255A-D to management device 130 as illustrated. Additionally, as new devices are introduced in a host computer, the host computer may update the option and script files provided to management device 130. Thus, when a user wants to effectuate a change across the entire system 240, the user may simply access user interface 146 for management device 130 to effectuate the change across the entire system 240, regardless of specific configuration requirements of each host computer 245A-D in system 240.

For example, each host computer 245A-D may include a different RAID controller so that accessing each host computer 245A-D would normally be required in order to achieve a common RAID configuration among host computers 245A-D. Since management device 130 includes various RAID configuration options in option files 250A-D, as well as the requisite script files 255A-D to accomplish a particular RAID configuration, the user may simply indicate RAID=1 (Disk Mirroring) through user interface 146, and management device 130 then may execute the option and script files to effectuate disk mirroring on host computers 245A-B.

Figure 3:
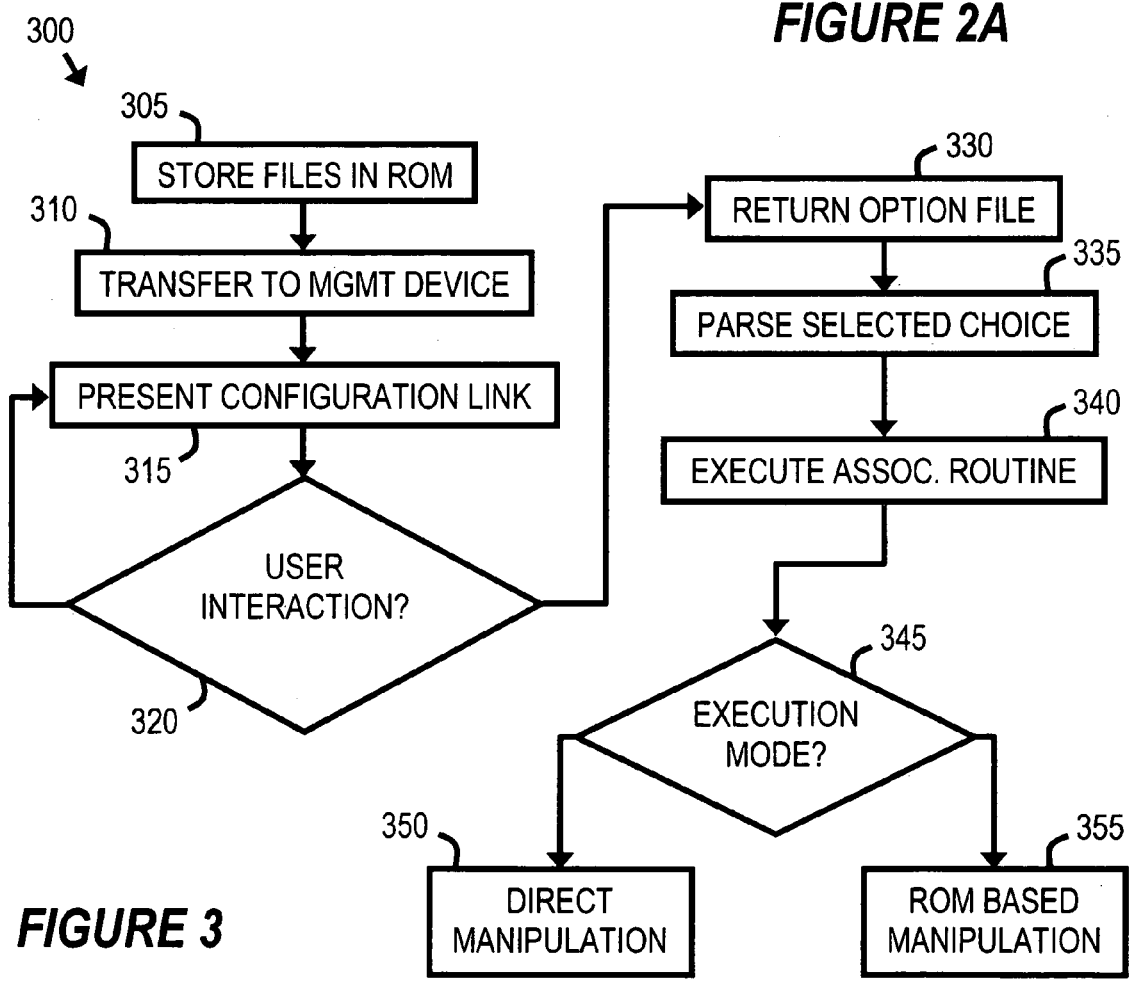
FIG. 3 depicts an exemplary algorithm.

FIG. 3 depicts an exemplary algorithm 300 that may be implemented by management device 130. Initially, ROM 125 may store option file 225 and script file 230, as represented in block 305. Although these files may be stored according to various storage specifications, in some embodiments of the present invention, these files may be stored in the ROM's System Management BIOS (SMBIOS) records as two separate strings. Briefly put, SMBIOS allows computers to provide internal settings information. For example, a piece of software may be able to determine the number of free memory slots for upgrading purposes or the type and brand of the boards installed in a computer's expansion slots by consulting the SMBIOS records.

Per block 310, the option file 225 and script file 230 may be transferred from ROM 125 to management device 130. The transfer, per block 310, may occur as a result of a request by management device 130 or some other device in system 100, or alternatively ROM 125 may decide to transfer the files to management device 130 of its own accord. The transfer set forth in block 310 preferably enables management device 130 to receive custom configuration information stored from host computers and therefore a user does not need to access each host computer to effectuate desired changes in the system because each host computer may generate and provide this information to management device 130.

Once management device 130 has received option file 225 and script file 230, remote management device may present a configuration link via user interface 146 as indicated in block 315. In some embodiments of the present invention, the configuration link presented may be a link on a web page displayed on a web browser. If the configuration link is presented via a web browser, then option file 225 may be a hyper-text-markup-language (HTML) file type. In block 320, remote device 130 waits for the user to engage the configuration link established by block 315. If there is no user interaction, then algorithm 300 preferably loops back to block 315.

Engaging the configuration link preferably causes option file 225 to be returned and processed by user interface 146, as set forth in block 330. For example, if user interface 146 is a web browser running on a client computer located on network 106, then the web browser may display the various options (boot order, RAID, etc.) as hyper-links, where clicking on a particular link may allow a user to further modify that particular option.

Once the user has made changes to the desired options, the user's desired choices may be returned to management device 130 so that it may parse and match each desired choice with the appropriate script from script file 230, as indicated in block 335. In some embodiments of the present invention, the return and parsing of blocks 330 and 335 may occur on the fly so that each configuration option is parsed and matched by management device 130 as soon as the user makes their selection. Alternatively, in other embodiments, all of the desired configuration options may be archived together so that they are parsed and matched as a group. In still other embodiments, management device 130 may convey the user's desired configuration to ROM 125 so that ROM 125 parses each desired configuration and matches it with the appropriate script from script file 230, instead of management device 130.

With the user's choices matched to an appropriate set of scripts and the scripts parsed, management device 130 preferably executes the scripts associated each configuration option in block 340, for example, using processor 205. In other embodiments, management device 130 may relay the parsed scripts back to ROM 125, and ROM 125 may execute the scripts associated with each configuration option. In this manner, the user may choose between execution by management device 130 or execution by ROM 125, per block 345.

If management device 130 is selected to execute the associated scripts, as set forth in block 350, then management device 130 may directly manipulate configuration settings 145 stored in NVRAM 135 through connection 150. Such a choice may be advantageous, for example, when host computer 102 is powered off. In this situation, auxiliary power 136 may provide power to NVRAM 135 as well as provide power to management device 130. Thus, a remote user could make adjustments to configuration settings 145, without having to physically power host computer 102 on first. Alternatively, when host computer 102 is powered on, ROM 125 may perform manipulations to configuration settings 145, as depicted in block 355.

The above discussion is meant to be illustrative of the principles and various embodiments of the present invention. Numerous variations and modifications will become apparent to those skilled in the art once the above disclosure is fully appreciated. For example, various components in system 100 may include separate ROMs with separate configuration options such as ROM 125 may support a dynamic power consumption regulator ROM and management device 130 may abstract information from these separate ROMs and configure them separately. In addition, while the potential configuration may vary, the method that the configuration options are stored for later retrieval also may vary, e.g., which BIOS to use at startup. Further, although the disclosure discusses web interfaces, command line interfaces, XML, and interactive configuration alternatives are possible. It is intended that the following claims be interpreted to embrace all such variations and modifications.

What is claimed is:

1. A computer system, comprising:
   a plurality of host computers; and
   a management device coupled to the plurality of host computers;
   wherein each host computer includes at least one read only memory (ROM) that is usable to configure an associated computer element;
   wherein each ROM stores an option file that contains one or more selectable configuration options for the associated computer element;
   wherein each ROM also stores a script file that contains subroutines that implement the one or more selectable configuration options from the option file stored on each such ROM.

2. The host computer of claim 1, further comprising an auxiliary power source coupled to the management device.

3. The host computer of claim 2, further comprising a nonvolatile storage coupled to the management device, wherein the nonvolatile storage includes a plurality of configuration options.

4. The host computer of claim 1, wherein the management device further comprises a processor that parses the script file.

5. The host computer of claim 4, wherein the processor parses the script file by matching a routine from the script file to a desired configuration option from the configuration option file.

6. A management device implemented in a computer system, comprising:
   a network interface that couples to a plurality of host computers, each host computer containing a configuration ROM that contains an option file and an associated script file, said configuration ROM being associated with and usable to configure a computer element, each such option file contains one or more selectable configuration options for the associated computer element and each script file contains subroutines that implement the selectable configuration options in an associated option file;
   wherein the management device receives multiple option files from the host computers based on configuration options of the plurality of host computers; and wherein the management device receives multiple script files associated with the multiple option files.

7. The management device of claim 6, wherein the plurality of host computers are capable of matching a routine from the script file to a configuration option of the option file.

8. The management device of claim 7, wherein the plurality of host computers execute the routine and directly amend configuration settings of a non-volatile storage of one of the plurality of host computers.

9. The management device of claim 6, wherein each configuration option file and associated script file are generated by a ROM in one of the plurality of host computers.

10. The management device of claim 9, wherein at least one of the configuration options is the boot order of a host computer.

11. The management device of claim 7, wherein the management device transfers the matching routine back to the host computer that is being configured for execution.

12. A method of configuring a plurality of host computers, comprising:
   each host computer generating at least two files using a configuration ROM that is contained within each such host computer;
   transferring a first file including a host computer's configuration options from the ROM to a management device;
   transferring a second file including scripts that effectuate the configuration options from the ROM to the management device; and
   determining a desired configuration option to be changed for each host computers;
   wherein the configuration ROM of each host computer is usable to configure a device contained with each such host computer.

13. The method of claim 12, further comprising matching a routine from the second file to a configuration option of the first file based on the desired configuration.

14. The method of claim 12, further comprising amending the first and second files in the management device in response to a change in the host computer's configuration.

15. The method of claim 13, further comprising executing the routine to manipulate data in a nonvolatile storage.

16. The method of claim 15, wherein executing occurs regardless of the power status of the host computer.

17. The method of claim 13, further comprising transferring the routine from the second file back to the ROM for execution.

18. The method of claim 13, further comprising executing the routine from the second file using a processor in the management device.

* * * * *

UNITED STATES PATENT AND TRADEMARK OFFICE
CERTIFICATE OF CORRECTION

PATENT NO.         : 7,447,889 B2                                                    Page 1 of 1
APPLICATION NO.    : 11/110157
DATED              : November 4, 2008
INVENTOR(S)        : Andrew C. Cartes et al.

It is certified that error appears in the above-identified patent and that said Letters Patent is hereby corrected as shown below:

In column 10, line 5, in Claim 12, delete "computers;" and insert -- computer; --, therefor.

Signed and Sealed this

Second Day of June, 2009

JOHN DOLL
*Acting Director of the United States Patent and Trademark Office*